UNITED STATES PATENT OFFICE.

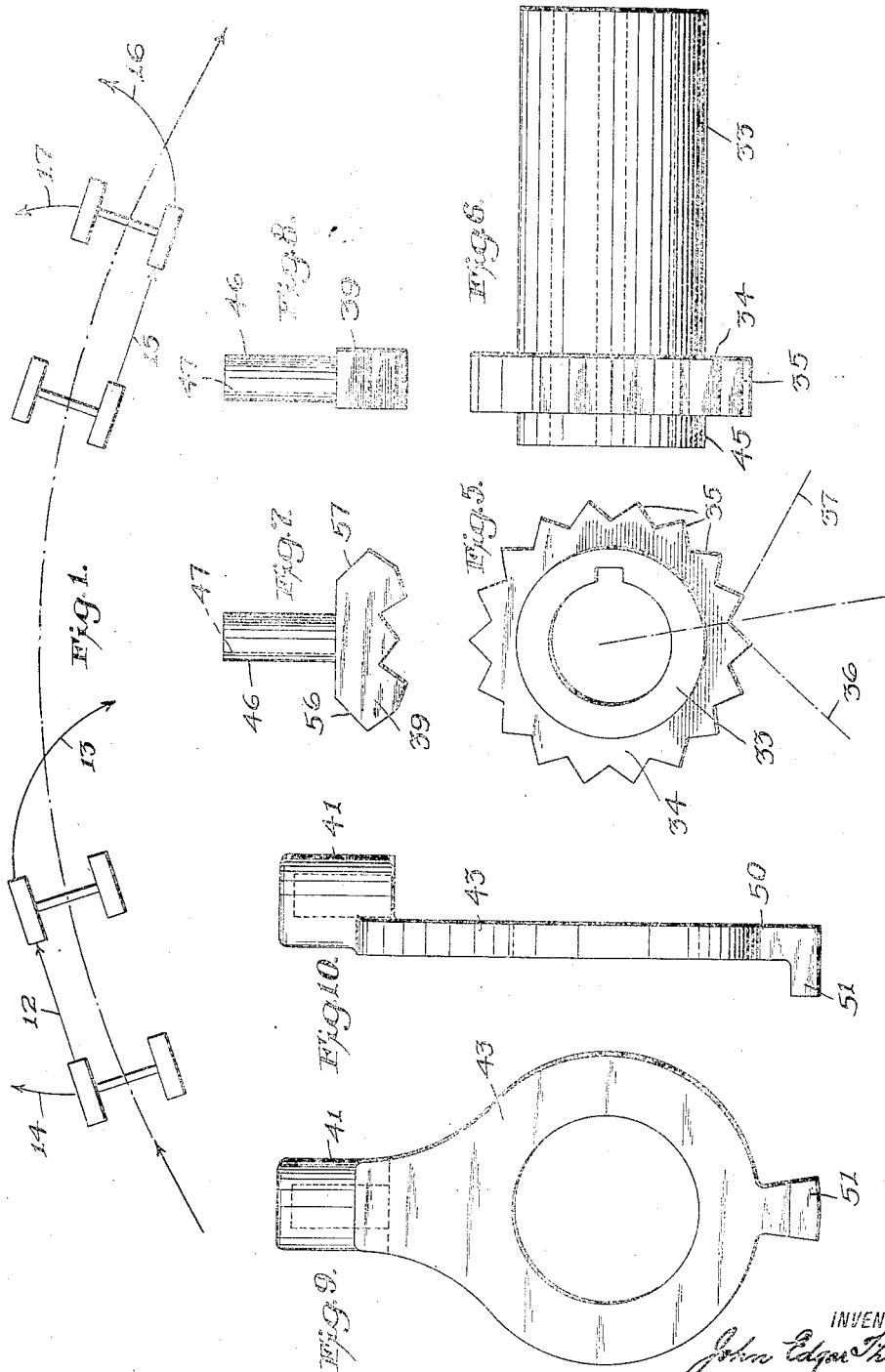

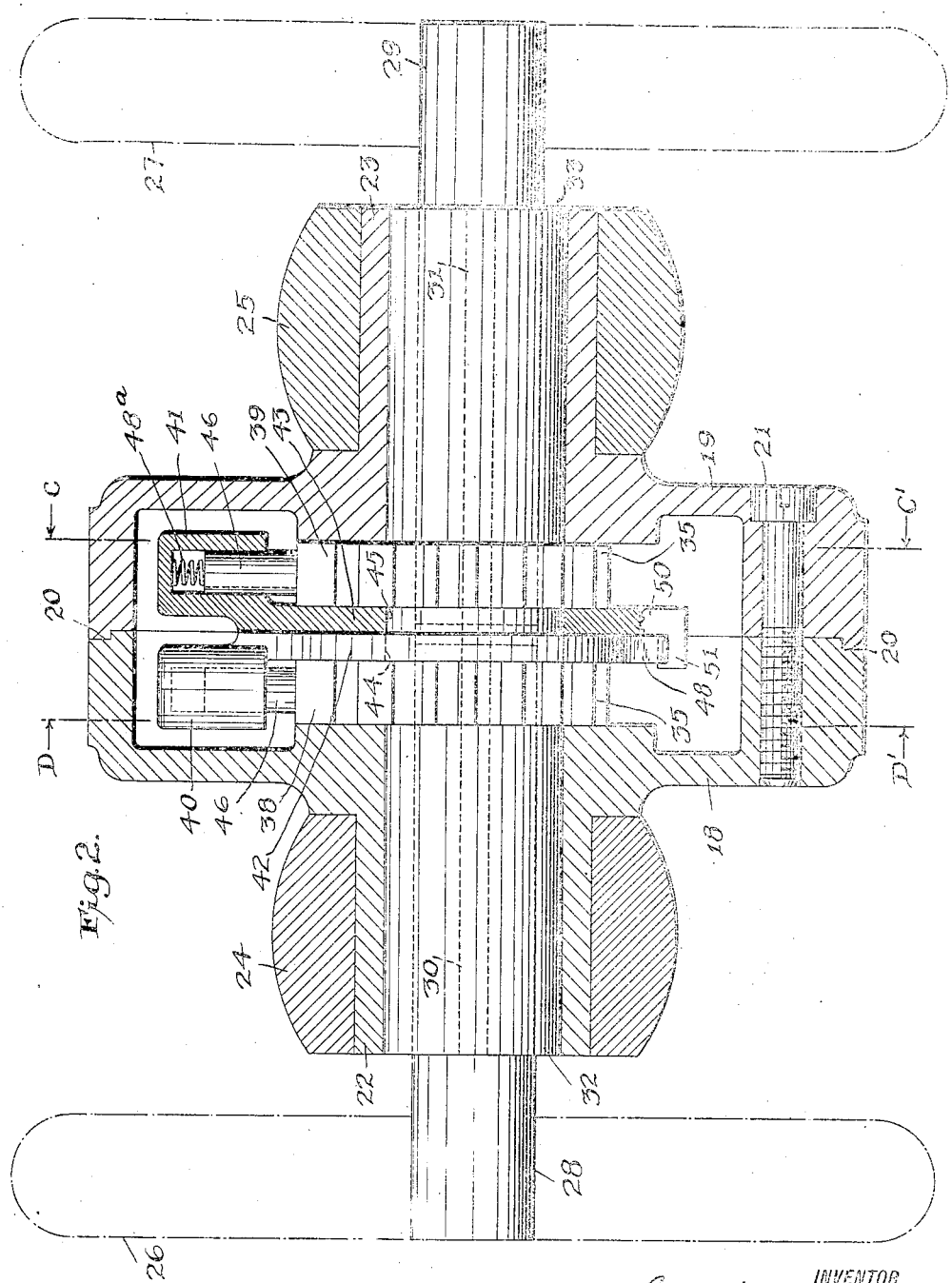

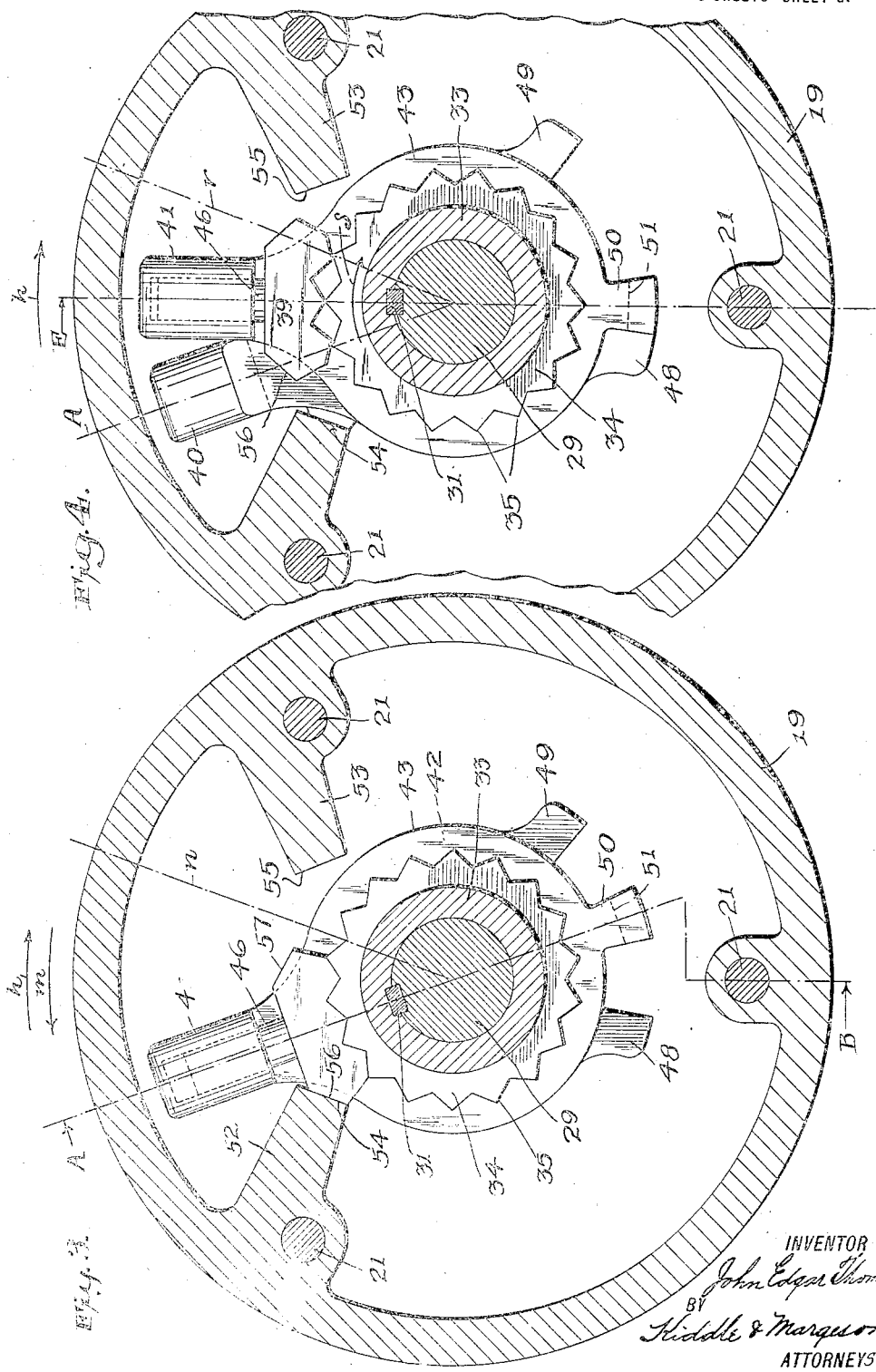

JOHN EDGAR THOMSON, OF GLEN RIDGE, NEW JERSEY.

REAR-AXLE DIFFERENTIAL FOR POWER-DRIVEN VEHICLES.

1,336,107.  Specification of Letters Patent.  Patented Apr. 6, 1920.

Application filed December 14, 1918. Serial No. 266,662.

*To all whom it may concern:*

Be it known that I, JOHN EDGAR THOMSON, a citizen of the United States, and a resident of Glen Ridge, county of Essex, and State of New Jersey, have invented certain new and useful Improvements in Rear-Axle Differentials for Power-Driven Vehicles, of which the following is a specification.

This invention relates to rear-axle differentials for power-driven vehicles and the dominant objects thereof are to decrease the tendency to skid, when making a turn under the motive power; to impart the motive power equally to both rear wheels, when the vehicle is either moving tangentially forward or rearward, and to prevent one wheel from being spun independently of the other.

A preferred embodiment of the invention is depicted in the accompanying drawings, forming a part of this specification, in which—

Figure 1 is a diagram to illustrate the principles that cause and avoid side-skidding, when a vehicle is being driven in the arc of a circle;

Fig. 2 is a longitudinal, center section through the casing, taken along the lines A, B of Fig. 3, disclosing the assembled device;

Fig. 3 is a transverse section along the plane C, C' of the casing, disclosing the interior mechanism in end elevation, yet substantially the same view would be developed if taken along the plane D, D';

Fig. 4 is the same view as Fig. 3 except that a portion of the mechanism is swung from the line A to the line E;

Figs. 5 and 6 show detail end and side views, respectively, of a portion of the device to be herein termed the ratchet-sleeve;

Figs. 7 and 8 show detail face and edge views, respectively, of an element to be termed the pawl; and Figs. 9 and 10 are face and edge views, respectively, of an element to be designated as the pawl-carrier.

The cause of side-skidding in automobiles is not as well known as the fact that they skid and as the principles involved are correlative with the present invention a brief description thereof will be primarily made. Thus, when an automobile is driven from a tangent to a curve, if an objectionable "drag" is to be avoided, the rear driving wheel on the outer radius of the curve must revolve more rapidly than the inner wheel. When a floating gear-differential is employed, to permit the foregoing acceleration of revolution, the maximum driving thrust is transferred to the said outer wheel; the primary result thereof, as seen in the diagram, Fig. 1, is to impart a tangential thrust, 12, to the forward wheel on the outer radius of the curve and the secondary result is to cause the forward wheel to progressively swing inwardly, to increase the sharpness of the curvature, as indicated by arrow 13. Hence, the rear of the car is liable to be swung outwardly, or overturned, as indicated by the arrow 14. But if the outer rear wheel is permitted to run free, that is at a differential rate of revolution greater than that of the inner wheel, and if the maximum impelling thrust is then imparted to the said inner wheel, as 15, the tendency is to swing the forward wheels outwardly, indicated by arrow 16. In other words, the effort tends to increase the curvature, to bring the car back to a tangential line of movement, as arrow 17. Consequently, the augmented liability to side-skidding, due to a defective impelling thrust of the driving wheel, is wholly obviated.

Another fundamental objection to the floating gear differential is that whichever rear wheel has the least coefficient of traction receives the greater portion of impelling power from the engine; for, as is well known, one rear wheel may be spun while the other remains motionless.

Referring to the drawings, the casing, or container, is formed of two similar sections, 18, 19, maintained in axial alinement by interlocking flanges, 20, and secured together, as by screws 21. On the outer sides of the sections are tubular journals, 22, 23, which rest in suitable bearings, as 24, 25, in which the casing as a whole revolves; but it has not been deemed necessary to depict means for producing revolution, which would ordinarily be a reducing gear-system connected to the source of power.

The vehicle wheels 26, 27, indicated in dotted outline, must be supposed as appropriately attached to split-axles, as 28, 29, whose inner ends are keyed, as 30, 31, to the ratchet-sleeves, 32, 33, which rest freely in the tubular journals of the casing.

These sleeves are provided with flanges, 34, in which are formed a series of saw-like teeth, 35, except that the component angles thereof, as 36, 37, Fig. 5, are equal to each other.

Two pawls 38, 39, having a plurality of teeth corresponding in form to those of the ratchet, are mounted in bearings, 40, 41, of the pawl-carriers, 42, 43, the latter being axially supported on the ends, 44, 45, of the ratchet-sleeves. The stems as 46, of the pawls may be tubular, as 47, to receive springs, as 48ª, which press the pawls inwardly into engagement with the ratchets. One of the pawl-carriers has two stops, 48, 49, and the other has one stop, 50, with a lateral projection, 51.

The interior of each section of the casing is provided with two lugs, 52, 53, having beveled faces, 54, 55, which are adapted to impinge upon corresponding bevels, 56, 57, on the pawls.

The foregoing component parts being assembled, as shown in Figs. 2, 3 and 4, the functioning of the device will now be described.

If the vehicle is driven along a tangent, the casing being revolved in the direction indicated by arrows $h$, the beveled faces of the left-hand lugs, 52, in each casing-section, impinge upon the pawls, and lock their teeth into positive engagement with the ratchets, whereby the ratchet-sleeves drive the shafts and the latter drive the wheels with a uniform distribution of power to each.

On the contrary, if the vehicle is driven along a curve and, for example, the right hand wheel 27, Fig. 2, is traversing the curvature of longer radius and its rate of revolution is increasing, its shaft will then automatically change from a driven to a driving member; therefore, its attached ratchet-sleeve will swing its coördinating pawl-carrier and pawl forwardly, or until arrested by the impingement of its stop-arm 51, against the lug, 48. This is the position of the device denoted in Fig. 4. The ratchet may then continue to revolve, as arrow $s$, at a differential rate of speed greater than that of the casing, as the pawl will simply be snapped in and out of engagement, as shown in the figure. When the road-curve will have been passed, and the rate of revolution of the outer wheel approximately equals that of the inner wheel its ratchet and pawl are again reset to the original position, that is as shown in Figs. 2 and 3.

What has just been described with respect of the right-hand wheel is precisely applicable to the left-hand wheel, when it passes around the longer radius of a curve, except only that the swing of the pawl-carriers would be reversed.

It will now be perceived that in each of the foregoing conditions of operation, the wheel which traverses the longer radius of a road-curve runs freely ahead of the other, while the wheel which traverses the shorter radius of the road-curve is the motive wheel, positively driven by the engine.

Again, if the vehicle is driven backwardly, when the movement of the casing would be in the direction of arrows $m$, Figs. 3 and 4, both of the pawl-carriers and their pawls would be shifted to their alternative positions, that of the lines $n$, $r$, and the functioning of the device will be precisely the same, under the same conditions, as when the direction of travel is forward.

There is no "dead" or jam-point in the action. Thus, should the pawl when pushed outwardly, as to the position shown in Fig. 4, remain thereat while the carrier is being retrieved either to the right hand or the left, it will be snapped off when it makes impact against the casing-lugs and pass into proper engagement with the ratchet.

The term "pawl", as herein employed, is more symbolic than exact in that, as usually utilized, it is a member which interlocks and thereby drives positively in one direction but is free to "ride" in the reverse direction. But as herein adapted, the pawls would not in themselves drive positively in either direction except as they are locked against the outward thrust of the ratchet by one or the other of the lugs. In other words, these pawls are double-acting to disengage freely in either direction but require an additional element, such as the lugs, to effect an interlock. Moreover, as here applied, if the retrieving springs should set or break the device would not thereby become inoperative, in that the impingement of their sloped ends against the corresponding slopes of the lugs would effect a positive engagement. As a consequence, the springs need not exert but a nominal thrust, whereby the friction upon the teeth, when freely snapping over each other, is practically negligible.

In sum, all of the desirable conditions primarily set forth are fully realized in this invention, which may be briefly restated as follows: When traversing a road-curve under power, the outer rear wheel runs free ahead of the inner rear wheel and the impelling thrust from the engine is derived from the said inner wheel, whereby side-skidding, when such is caused by an abortive thrust, is avoided; when the traction of each wheel, traveling on a tangent, is equal to the other, the impelling thrust is equal to each; when the traction of one wheel is greater than that of the other, the impelling thrust is thereto correspondingly increased; when the vehicle is run backward, the conditions of operation are the same as when going forward and when a vehicle is run down hill by gravity, the engine acting as a brake, the benign conditions of operation are equally called into play.

Attention is directed to the fact that this device presents no unusual structural difficulties, hence may be produced at a relatively low cost; also that it possesses the elements which insure endurance.

A contingent advantage of distinct utility may also be adverted to, namely, that the vehicle is much more easily steered; that, in an emergency, a quicker turn can be made with safety and that the duty imposed upon the steering-gear is substantially reduced.

What I claim is:

1. A differential for power-driven vehicles, comprising in combination, a two part revoluble casing, split axles therein, ratchet sleeves attached to said axles, pawl carriers mounted to partially revolve upon said sleeves, double acting pawls mounted in said carriers and coöperating with said ratchet sleeves, and a plurality of lugs in said casing each of which is adapted to cause a pawl to engage with a ratchet when the casing is acting as a driving member.

2. A differential for power-driven vehicles, comprising in combination, a two part revoluble casing, split axles therein, ratchet sleeves attached to said axles, pawl carriers mounted to partially revolve upon said sleeves, double acting pawls mounted in said carriers and coöperating with said ratchet sleeves, and a plurality of lugs in said casing each of which is adapted to cause a pawl to engage with a ratchet when the casing is acting as a driving member in either direction of revolution.

3. A differential for power-driven vehicles, comprising a two part revoluble casing, split axles therein, ratchet sleeves attached to said axles, pawl carriers mounted to partially revolve upon said sleeves, double acting pawls mounted in said carriers, a plurality of fixed lugs in the casing adapted to engage the pawls at alternate ends thereof to interlock the same with the ratchets, whereby when either of said ratchet sleeves acts as a driving member its pawl will be automatically disengaged from the corresponding lug, permitting the ratchet to run free.

4. In a differential for power-driven vehicles, the combination with a revoluble casing, beveled faced lugs and ratchet sleeves therein, pawl carriers and double acting pawls carried thereby to coöperate with said ratchet sleeves, the said pawl carriers being mounted to partially revolve upon the abutting ends of the ratchet sleeves, and stops for limiting the extent of revolution of either of the carriers.

5. In a differential for power-driven vehicles, the combination with a revoluble casing, beveled faced lugs and ratchet sleeves therein, pawl carriers and double acting pawls carried thereby to coöperate with said ratchet sleeves, the said pawl carriers being mounted to partially revolve upon the abutting ends of the ratchet sleeves, said carriers being provided with stops for limiting the extent of revolution of either of the carriers.

This specification signed and witnessed this 11th day of December, 1918.

JOHN EDGAR THOMSON.

Signed in the presence of—
JOHN THOMSON,
J. R. AGNEW.